Figure 3:
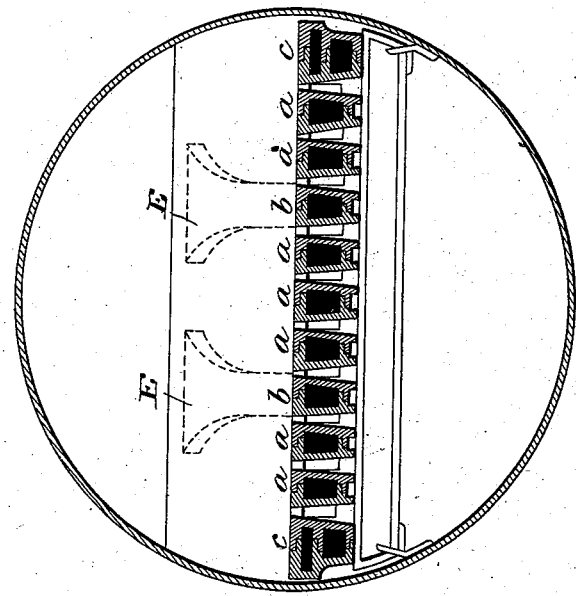

(No Model.) 4 Sheets—Sheet 1.
A. TOLHURST, C. A. GLAZBROOK, A. PHILBEY & T. LOCKERBIE.
GRATE.
No. 381,185. Patented Apr. 17, 1888.
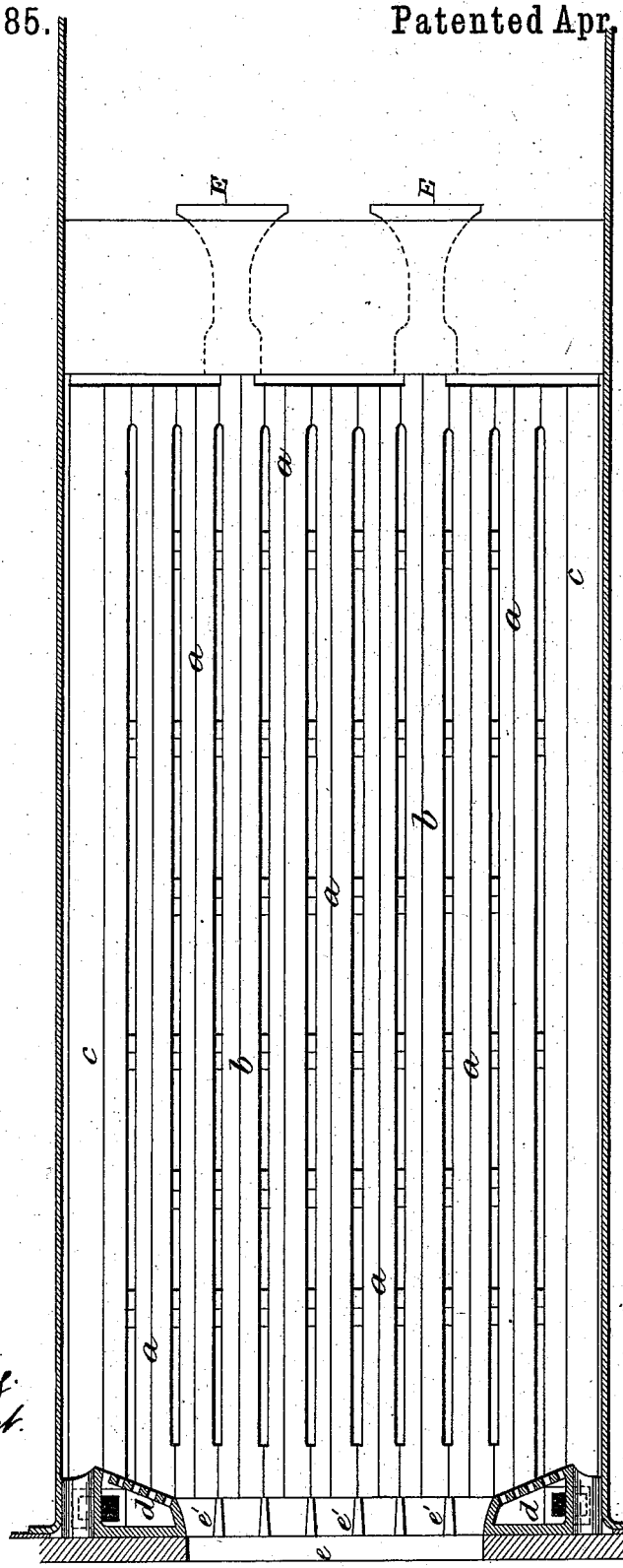
Fig. I.
Witnesses.
Inventors.

(No Model.) 4 Sheets—Sheet 2.

A. TOLHURST, C. A. GLAZBROOK, A. PHILBEY & T. LOCKERBIE.
GRATE.

No. 381,185. Patented Apr. 17, 1888.

(No Model.) 4 Sheets—Sheet 3.
A. TOLHURST, C. A. GLAZBROOK, A. PHILBEY & T. LOCKERBIE.
GRATE.
No. 381,185. Patented Apr. 17, 1888.
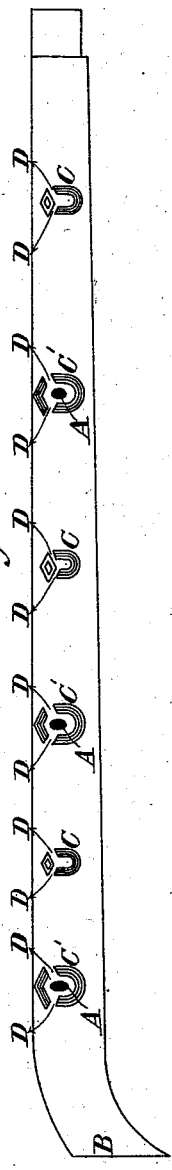
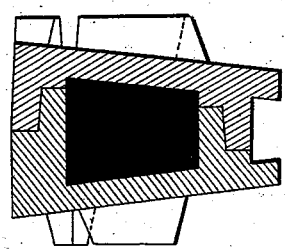
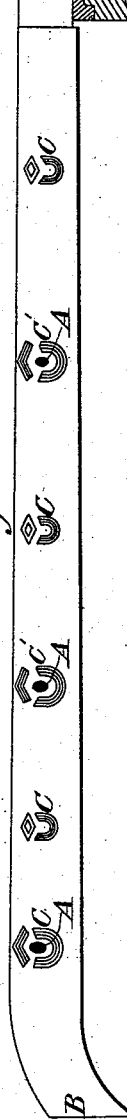
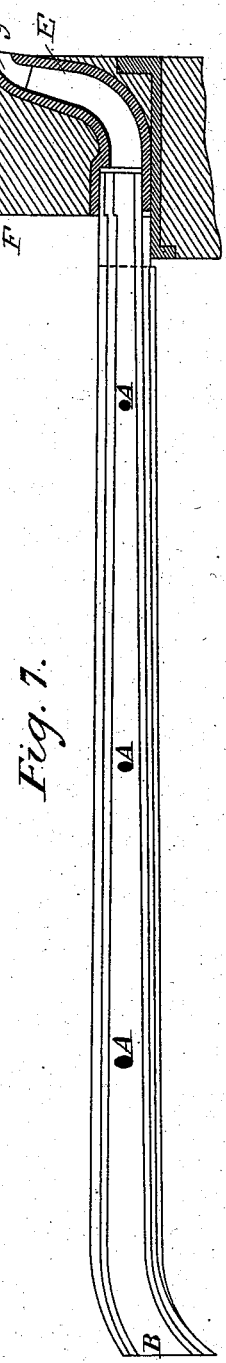
Witnesses
Inventors (No Model.) 4 Sheets—Sheet 4.

A. TOLHURST, C. A. GLAZBROOK, A. PHILBEY & T. LOCKERBIE.
GRATE.

No. 381,185. Patented Apr. 17, 1888.

Witnesses
Baltus D. Long.
Allan McLane Abert.

Inventors
A. Tolhurst,
C. A. Glazbrook,
A. Philbey,
T. Lockerbie,
By their attys
Baldwin, Hopkins & Peyton.

UNITED STATES PATENT OFFICE.

ALFRED TOLHURST, OF GRAVESEND, CHARLES ALFRED GLAZBROOK, OF CHARLTON, AND ABEL PHILBEY, OF GRAVESEND, COUNTY OF KENT, AND THOMAS LOCKERBIE, OF COMMERCIAL ROAD, COUNTY OF ESSEX, ENGLAND; SAID GLAZBROOK, PHILBEY, AND LOCKERBIE ASSIGNORS TO SAID ALFRED TOLHURST.

GRATE.

SPECIFICATION forming part of Letters Patent No. 381,185, dated April 17, 1888.

Application filed September 20, 1887. Serial No. 250,202. (No model.) Patented in England December 10, 1884, No. 16,241, and June 25, 1886, No. 8,407; in France June 29, 1886, No. 177,074; in Belgium June 30, 1886, No. 73,676, and in Germany July 8, 1886, No. 39,241.

*To all whom it may concern:*

Be it known that we, ALFRED TOLHURST, of Gravesend, solicitor, CHARLES ALFRED GLAZBROOK, of 7 Sundorne Road, Charlton, engineer, ABEL PHILBEY, of 11 Victoria Road, Perry street, Gravesend, contractor, all in the county of Kent, England, and THOMAS LOCKERBIE, of 95 Lucas Street, Commercial Road, in the county of Essex, England, engineer, subjects of the Queen of Great Britain, have invented certain new and useful Improvements in Fire-Grates for Steam-Boiler and other Furnaces, (for which we have received Letters Patent in Great Britain No. 16,241, dated December 10, 1884, and No. 8,407, dated June 25, 1886; in France No. 177,074, dated June 29, 1886; in Belgium No. 73,676, dated June 30, 1886, and in Germany No. 39,241, dated July 8, 1886,) of which the following is a specification.

This invention has for its object improvements in fire-grates for steam-boiler and other furnaces.

Hollow fire-bars are employed for the purpose of supplying air to the fuel on the fire-grate. These bars are each divided longitudinally into two parts, and the parts are held in position by means of interlocking projections and rabbets formed on each part. The joint also is made good with refractory materials. The bars thus constructed are easily taken apart and the passage within cleared and freed from dust or other deposit. At the front end of the fire-bar there is an open mouth, and a nozzle directs a jet of steam into it. The steam carries air with it into the interior of the hollow bar, and the air, having become heated issues together with the steam and comes into contact with the fuel on the fire-grate. The delivery-orifices are at the sides of the fire-bars. On the sides of the fire-bars also there are interlocking projections, which aid in keeping the bars in place, and which also tend to prevent change of form. The delivery-orifices are formed within the projections, and passages through them direct the air and steam obliquely upward. The delivery-orifices are graduated in size. Those nearest the front are of larger sectional area than those at the back. This is done in order that each orifice may deliver to the fuel approximately the same quantity of air. The mouth or entrance end of the bar is bent or curved downward, so that the opening at the end of the bar is below the front framing of the furnace clear of any obstruction there might otherwise be in the way of the steam nozzles and jets and to the free entrance of air together with the steam into the bar.

One or more of the bars of the fire-grate we connect with passages which convey the heated air to the back of the bridge. Preferably these passages are formed in hollow swan-necked castings, which are built into the bridge. The heated air and steam issuing from the swan-neck causes very perfect combustion behind the bridge. The bars at the sides of the fire-grate we make with double or return passages. The entrance-mouth is at the outer end of the lower passage and the upper is the return-passage. It delivers the heated air, together with the steam, to a distributing-rose fixed at the front of the furnace above the fuel on the fire-grate. The supply of air in this manner is very effective in consuming smoke.

In order that the said invention may be fully understood and readily carried into effect, we will proceed to describe the drawings hereunto annexed.

Figure 2:
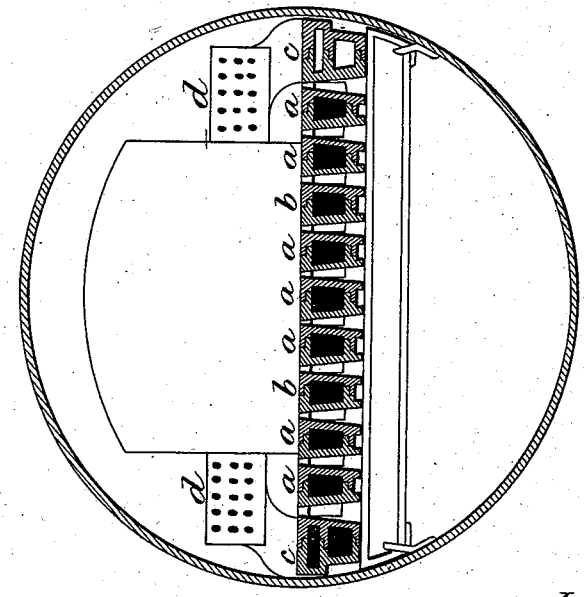
Figure 11:
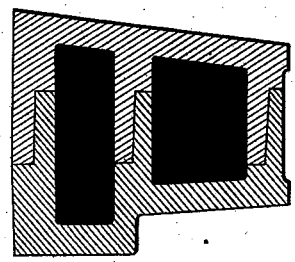
Figure 9:
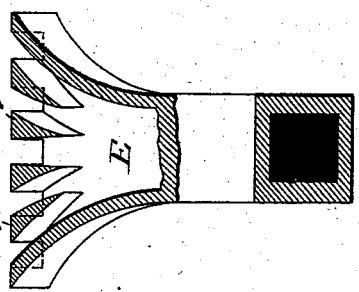
Figure 8:
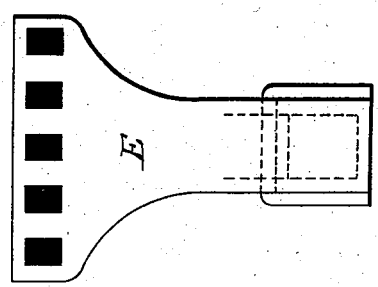
Figure 10:
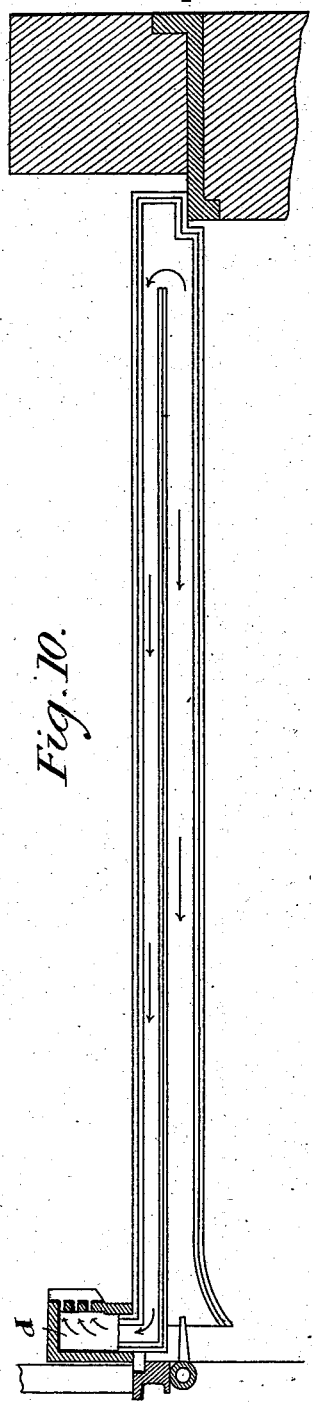

In the drawings, Figure 1 is a plan, partly in section, of the fire-grate. Fig. 2 is a vertical transverse section of the fire-grate, looking toward the front or fire-door end. Fig. 3 is a vertical transverse section of the fire-grate, looking rearward or toward the bridge. Fig. 4 represents an outside elevation of one-half of a tapered hollow bar. Fig. 5 represents to a larger scale a transverse section of the bar, and shows how the two halves fit together with rabbeted joints. Fig. 6 represents a similar bar with a swan-necked exit-pipe attached. Fig. 7 shows an elevation of the inner side of one-half of the bar and with the bridge and swan-necked exit-pipe in section. Fig. 8 shows to a larger scale a rear elevation of the swan-neck. Fig. 9 is a section of the same. Fig. 10 shows in elevation one-half of the double-passage fire-bar at the side of the grate with other parts in connection therewith. Fig. 11 shows to a larger scale a transverse section of the bar.

In the general views, Figs. 1, 2, and 3, a a are the intermediate fire-bars without exit-pipes, as represented in Fig. 4. b b are the intermediate bars connected with swan-necked exit-pipes E, formed by castings built into the bridge F, as seen in Figs. 6 and 7. c c are the side fire-bars connected with distributing-roses d at the front of the furnace and above the level of the fuel on the fire-grate. e is a steam-pipe, and e' are nozzles upon it, blowing steam into the mouths of the hollow fire-bars.

In Fig. 4, A A are the delivery-apertures in the side of the hollow fire-bar, and these are also seen in Figs. 6 and 7. These apertures are graduated in size. In a bar, say, five feet six inches long the hole next the mouth may be five-eighths of an inch square, the next four-eighths of an inch, and the farthest hole three eighths. In longer bars an additional smaller hole is added at the far end. B is the bent mouth-piece, into which the jet of steam is injected, and the jet carries air with it into the interior of the bar. C C' are projections on the side of the bar. The projections C on one bar enter the projections C' on the next. The apertures A A are arranged within these projections and the steam and air are delivered through them and by passages through the projections in the directions indicated by the arrows D. Before placing together the two parts of each fire-bar the joint-surfaces are coated with fire-clay mixed to a semi-fluid consistency.

In Figs. 6, 7, 8, and 9 the form of the swan-neck exit-pipe is seen. As will be observed, the exit is contracted and divided by partitions $f$ and the upper lip, $g$, is brought slightly beyond the lower. The bar shown by Figs. 6 and 7 is freely open at the end connected with the exit-pipe; but the bars (a, Fig. 1) which are not connected with exit-pipes are closed at the far end.

The side bar shown by Figs. 10 and 11 is closed at the far end and it has two passages in it, an upper and a lower. At the fore end of the lower passage is the mouth which receives the steam-jet. There are no delivery-apertures on the lower passage, and as the bar is shown in the drawings the whole of the air and steam are delivered at the fore end of the upper passage into the distributing-rose.

What we claim is—

1. A fire-grate having hollow fire-bars divided longitudinally each into two parts, and having on their sides interlocking projections with apertures through which to deliver air and steam to the fire on the fire-grate, substantially as described.

2. A fire-grate having hollow fire-bars provided with open mouths or entrances and having along their sides interlocking projections, with delivery-orifices within the projections, and passages leading from them obliquely upward through the projections, substantially as set forth.

3. A fire-grate having hollow fire bars divided longitudinally into two parts and having upper and lower passages, the latter with an open mouth or entrance and the former delivering air and steam to the fire above said mouth, substantially as described.

4. In a fire-grate, the combination of a hollow fire-bar divided longitudinally into two parts and having upper and lower passages, and at the outer end an open mouth to receive a steam-jet, with a rose-piece or apertures over the mouth at the front of the furnace for the delivery of air and steam to the fuel, substantially as described.

ALF. TOLHURST.
    CHARLES ALFRED GLAZBROOK.
    ABEL PHILBEY.
    THOMAS LOCKERBIE.

Witnesses:
 JNO. THOS. MARSHALL,
 I. TOWNSEND THOMPSON.